UNITED STATES PATENT OFFICE.

DORSEY R. POTTER, OF CLARKSBURG, WEST VIRGINIA, ASSIGNOR TO HOWELL C. COOPER, OF CLARKSBURG, WEST VIRGINIA.

METER FOR GAS MEASUREMENT.

1,260,575.            Specification of Letters Patent.     Patented Mar. 26, 1918.

Application filed May 15, 1916. Serial No. 97,628.

*To all whom it may concern:*

Be it known that I, DORSEY R. POTTER, a citizen of the United States, residing at Clarksburg, in the county of Harrison and State of West Virginia, have invented certain new and useful Improvements in Meters for Gas Measurement; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to fluid meters.

It relates more particularly to the type of fluid meter disclosed in my co-pending application, Serial No. 54,800, filed October 8th, 1915. In the type of meter disclosed in said application the fluid to be measured has heat imparted thereto by products of combustion and the temperature effect of the heat transfer between the products of combustion and the fluid is utilized in determining the rate of flow of the fluid. The fluid is heated by means of a heating coil containing a liquid that is heated by the products of combustion.

One object of this invention is to provide a meter of the above type in which there is a more direct heat interchange between the products of combustion and the fluid to be measured.

Another object is to provide a meter of the above type which is well adapted to meet commercial requirements.

Another object is to provide means for efficiently distributing the heat from the products of combustion to the fluid to be measured.

Other objects will appear as the specification proceeds.

One embodiment of the invention is illustrated in the accompanying drawings, in which:—

Figure 1 is a side elevation of the meter;

Fig. 2 a vertical longitudinal section through the meter;

Fig. 3 is a vertical transverse section of the meter;

Fig. 4 is a side elevation of one of the heat conducting plates; and

Fig. 5 is a vertical section through the same.

Figure 1:
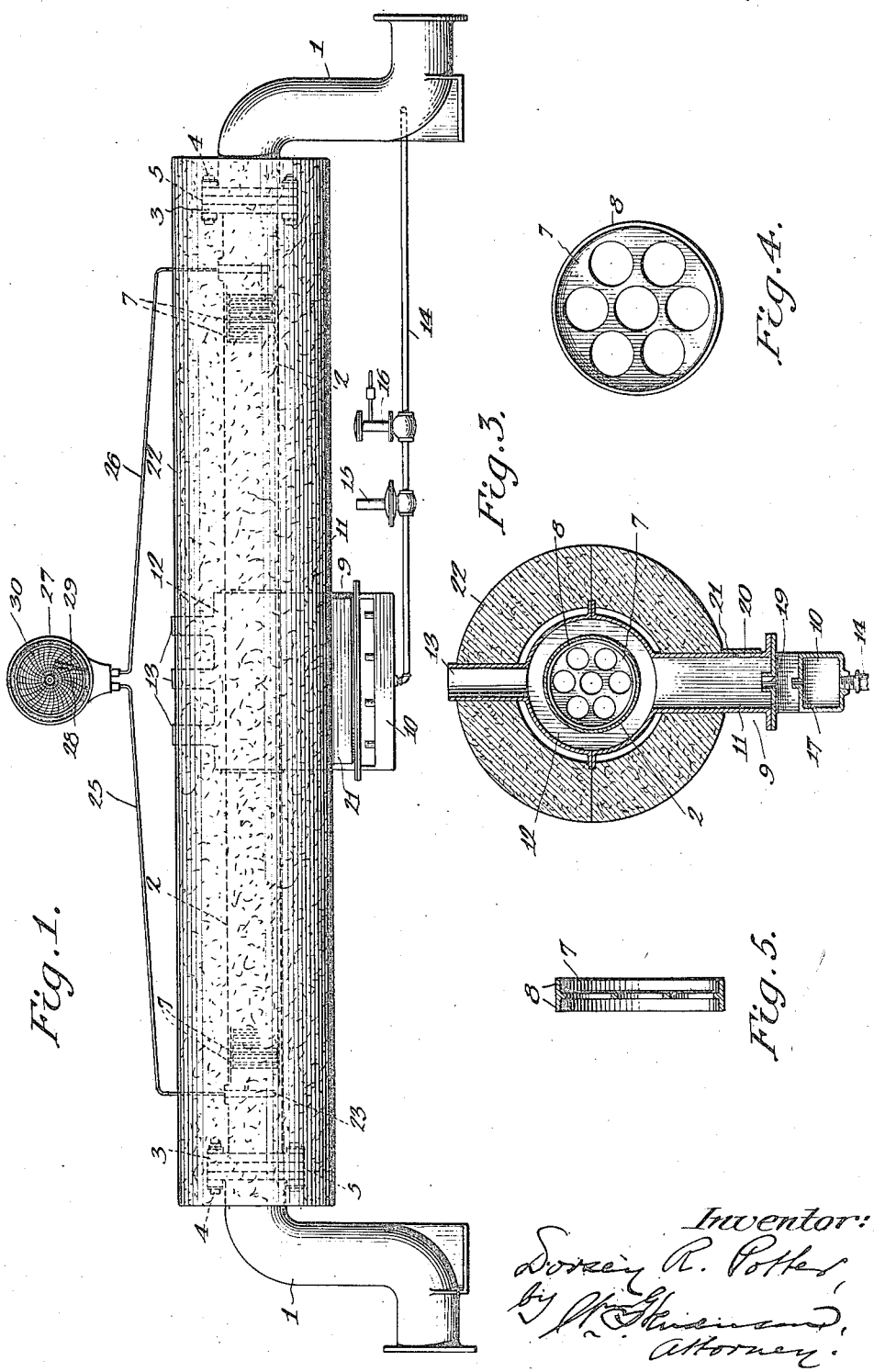
Figure 2:
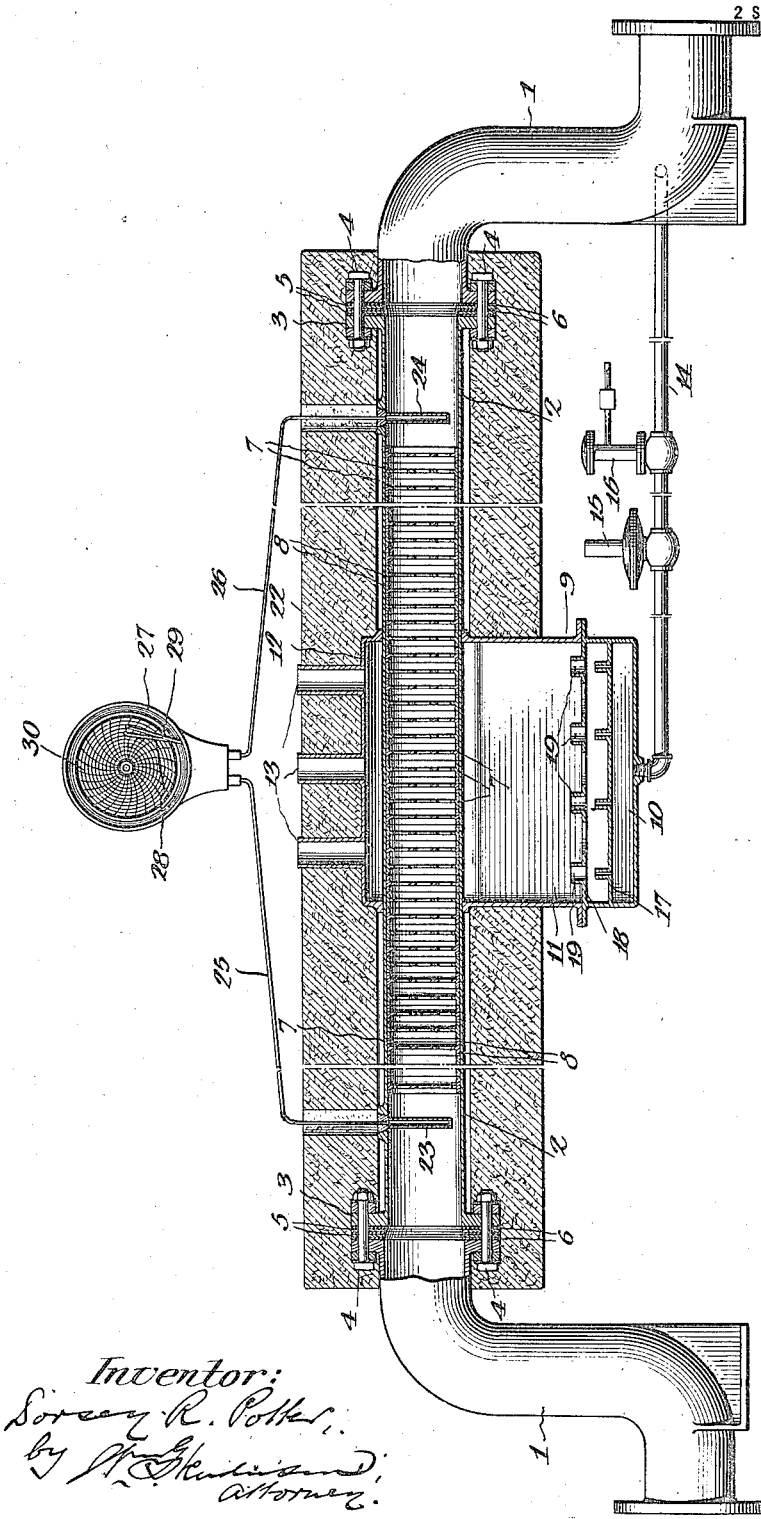

The meter comprises in general a conduit through which the fluid to be measured flows. The conduit is heated by means of products of combustion which come into direct contact with the outer surface of the conduit. A portion of the conduit passes through a heater and it is this portion of the conduit with which the products of combustion are directly in contact. Heat conducting elements are positioned in the conduit practically throughout the length of the same so that the heat is distributed to the fluid in the conduit not only at that portion of the conduit which passes through the heater but also at those portions of the conduit at each side of the heater. The conduit and a portion of the heater are inclosed by means of heat insulating material so that practically all of the heat generated is utilized to heat the fluid. The temperature effect produced upon the fluid by the heat imparted thereto is measured by means of expansion thermometers, one being placed near the entrance of the conduit and the other near the exit thereof.

In the drawings the numeral 1 designates elbows which may be continuations of a main through which flows a body of fluid such as natural or other gas from the point of supply to a point of distribution. Between these elbows and forming a part of the conduit for the flow of the gas is a tube or conduit 2 formed preferably of steel, and having at opposite ends flanges 3 for coupling to the ends of the elbows 1 by means of suitable fastening devices such as the bolts 4. The flanges of the tube and the elbows have between them separating plates 5 and nonconducting or insulating packing sheets or members 6 for the purpose of preventing heat imparted to the tube 2 being conducted to the elbows and connecting portions of the gas main. The tube 2 may be of any suitable length and dimensions and contains a number of heat conducting elements which preferably are in the form of apertured disks or plates 7 having peripheral rims 8 and which preferably are of steel and are shrunk into place so as to make practically close or intimate contact with the inner face or wall of the tube so that heat imparted to the walls of the tube may be conducted and transmitted by the disks 7 to the body of gas flowing through the tube.

For the purpose of heating the tube 2 for transmission of its heat through the disks 7 to the flowing gas, a suitable heater 9 is provided. This heater consists of a chamber 10 of suitable material and shape containing the heating agent which may be generated from gas or other fuel. The chamber preferably comprises a compartment 11 in which the heat is generated, an annular chamber 12 which encircles the gas conduit or tube 2 so that the tube will be heated, and chimneys or flues 13 for the discharge of the waste gases or cumbustion products. The heat may be generated from any suitable fuel but preferably is generated from gas which may be derived from the gas main by a by-pass 14 leading therefrom to the lower part of the heater and provided with regulators 15 and 16 of any suitable well known type for maintaining a fixed pressure of the fuel gas in the lower part of the heater. In the heater above its bottom is a partition 17 having jet nozzles for the projection of the fuel gas and above such partition is another partition 18 having mixing nozzles or tubes 19, and in the side of the compartment 11 adjacent to the mixing tubes 19 are formed openings 20 controlled by a damper 21 for supplying air to promote combustion.

To prevent waste of heat by outward radiation from the conduit or tube 2 and reduce such radiation to a negligible quantity and to better insure the maximum transmission of heat from the walls of the tube to the inwardly extending conducting disks 7, the tube 2 is incased in a jacket 22 of asbestos or other suitable insulating material. This jacket also incases a portion of the heating chamber as shown.

For the purpose of noting the temperature of the gas at the receiving end of the tube or conduit 2 and also at the discharge end of said conduit after additional heat has been imparted by the heater, thermometer bulbs 23 and 24 are placed in the respective ends of the tube or conduit. One of the bulbs is connected by a tube 25 and the other by a tube 26 with the marking finger or fingers of a thermometer or heat recording instrument 27. This recording instrument may be of any approved type for recording the two temperatures or the differential temperature of the gas between the receiving and discharge ends of the gas conduit. In the drawing a well known form in which the recording fingers are actuated by expansion of the tubes under the action of a heated fluid therein is conventionally illustrated. It has two record-fingers 28 and 29 which make separate records on the revolving dial 30 of the instrument, one recording the temperature of the gas at the receiving end and the other its temperature at the discharge end, the difference in temperature indicating the degree of heat absorbed by the gas in passing through the heated portion of the conduit. Any suitable well known differential thermometer may be used for such purpose and therefore details of construction thereof are unnecessary.

In operation the fluid to be measured passes through the conduit 2 and is heated by the heater 9. The heat conducting plates 7 serve to conduct the heat from the walls of the conduit and efficiently distribute it to the fluid flowing through the conduit. The fluid as it passes through the perforations of the relatively large number of heat conducting plates is therefore uniformly heated and practically all of the heat of the products of combustion is imparted to the fluid. This result is further promoted due to the heat insulating covering 22 which conserves the heat. As the supply of heat is maintained constant the rate of flow of the fluid through the conduit may be determined by reading the chart 30 as the rise in temperature of the fluid is a direct indication of its rate of flow.

It will now be noted that a meter constructed in accordance with the present invention will fully meet commercial requirements where electrical energy is not available for heating the fluid or where its use is not practicable. The meter is comparatively simple in its construction as the heat from the products of combustion is applied directly to the conduit through which the fluid flows. Furthermore, the heat is well conserved and practically all of it is distributed to the fluid.

The structure herein disclosed is merely illustrative of the invention and it will be understood that many changes may be made therein without departing from the spirit or scope of the invention as defined in the accompanying claims.

Having described my invention and set forth its merits what I claim is:

1. A fluid meter comprising a conduit through which the fluid to be measured flows, said conduit being connected at opposite ends with a main and having a heat conducting wall, means for heating the wall of the conduit, heat conducting elements in contact with the wall of the conduit and projecting into the conduit to transmit heat to the fluid passing therethrough, an insulating jacket on the conduit, insulating means interposed between the ends of the conduit and said main, and means for noting the rise in temperature of the fluid being measured.

2. A fluid meter comprising a conduit for the fluid having a heat conducting wall provided with heat conducting elements projecting inwardly from said wall for transmitting heat therefrom to the fluid flowing through the conduit, a heater through which the conduit extends for heating the wall of the conduit, and means for noting the rise in temperature of the fluid flowing through the conduit.

3. A fluid meter comprising a conduit for the fluid having a heat conducting wall, means for heating the wall of the conduit, apertured plates within the conduit for conducting heat from the wall of the conduit to the fluid flowing therethrough and means for noting the rise in temperature of the fluid flowing through the conduit.

4. A fluid meter comprising a conduit for the fluid having a heat conducting wall and heat conducting elements extending inwardly from the wall, a heater within which a portion of the conduit lies for applying heat externally to the walls of the conduit, an insulating covering for the heater and a portion of the conduit outside of the heater, and means for noting the rise in temperature of the fluid flowing in the conduit.

5. A fluid meter comprising a conduit adapted to be connected to a fluid main through which a fluid flows whose rate of flow is to be measured, means comprising a fluid burner for directly heating said conduit and means whereby the effect of the heat transfer between the conduit and the fluid may be utilized in determining the rate of flow of the fluid.

6. A fluid meter comprising a conduit adapted to be connected to a fluid main through which a fluid flows whose rate of flow is to be measured, means comprising a fluid burner for directly heating said conduit and means whereby the effect of the heat transfer between said conduit and the fluid may be utilized in determining the rate of flow of the fluid, said means comprising temperature indicating means responsive to the temperature of the fluid before and after being heated.

7. A fluid meter comprising a conduit adapted to be connected to a fluid main through which a fluid flows whose rate of flow is to be measured, means for heating the fluid comprising means for generating products of combustion which are brought into direct contact with said conduit, and means whereby the effect of the heat transfer between the conduit and the fluid may be utilized in determining the rate of flow of the fluid.

8. A fluid meter comprising a conduit adapted to be connected to a fluid main through which a fluid flows whose rate of flow is to be measured, means to heat the walls of said conduit, and means whereby the effect of the heat transfer between the conduit and the fluid may be utilized in determining the rate of flow of the fluid.

9. A fluid meter comprising a conduit adapted to be connected to a fluid main through which a fluid flows whose rate of flow is to be measured, means to heat said conduit, means to distribute the heat to the fluid within the conduit, and means whereby the effect of the heat transfer between the conduit and the fluid may be utilized in determining the rate of flow of the fluid.

10. The method of measuring the rate of flow of a fluid which consists in bringing the fluid into direct heat exchanging relation with products of combustion and utilizing the effect upon the fluid in determining the rate of flow of the fluid.

11. The method of measuring the rate of flow of a fluid which consists in passing the fluid to be measured through a conduit, heating the walls of the conduit by means of products of combustion and utilizing the effect upon the fluid in determining the rate of flow of the fluid.

12. The method of measuring the rate of flow of a fluid which consists in bringing the fluid into direct heat exchanging relation with products of combustion and utilizing the effect of the heat transfer in determining the rate of flow of the fluid.

In testimony whereof I affix my signature in the presence of two witnesses.

DORSEY R. POTTER.

Witnesses.
J. M. BURR,
H. O. GARRISON.